US008982143B2

(12) United States Patent
Johnston et al.

(10) Patent No.: US 8,982,143 B2
(45) Date of Patent: Mar. 17, 2015

(54) METHOD AND APPARATUS FOR CONSTRUCTING VIRTUAL SLOPED LANDSCAPES IN COMPUTER GRAPHICS AND ANIMATION

(75) Inventors: Rory Johnston, Redmond, WA (US); Brian McNeely, Redmond, WA (US); Kunitake Aoki, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 295 days.

(21) Appl. No.: 13/160,305

(22) Filed: Jun. 14, 2011

(65) Prior Publication Data

US 2011/0304638 A1 Dec. 15, 2011

Related U.S. Application Data

(60) Provisional application No. 61/354,553, filed on Jun. 14, 2010.

(51) Int. Cl.
*G09G 5/00* (2006.01)
*G06T 11/40* (2006.01)

(52) U.S. Cl.
CPC ...................................... *G06T 11/40* (2013.01)
USPC .......................................................... 345/582

(58) Field of Classification Search
CPC ........................ A63F 2300/6018; G06T 11/40
USPC ....................................................... 345/582
See application file for complete search history.

(56) References Cited

U.S. PATENT DOCUMENTS

| 5,577,185 | A  | * | 11/1996 | Tunnell et al. | 345/473 |
| 7,110,000 | B2 | * | 9/2006  | Zhang et al.   | 345/582 |
| 7,965,902 | B1 | * | 6/2011  | Zelinka et al. | 382/284 |
| 2010/0053161 | A1 | * | 3/2010 | Chuter | 345/424 |

OTHER PUBLICATIONS

Carlson (Carlson, Jeff, "Visual Quickstart Guide: Photoshop Elements 6 for Windows", Peachpit Press, 2008).*
Brodersen et al. (Brodersen, Anders, et al., "Geometric Texturing Using Level Sets", IEEE Transactions on Visualization and Computer Graphics, vol. 14, No. 2, Mar./Apr. 2008).*
Zhang, "Synthesis of Progressively-Variant Textures on Arbitrary Surfaces" (ACM SIGGRAPH 2003).
Hertzmann, "Image Analogies" ACM SIGGRAPH 2001.

* cited by examiner

*Primary Examiner* — Devona Faulk
*Assistant Examiner* — William Beutel
(74) *Attorney, Agent, or Firm* — Nixon & Vanderhye P.C.

(57) ABSTRACT

There are both flat and sloped ground surfaces on which the game characters traverse. In areas where a sloped surface changes angle (i.e. where a sloped surface connects to a flat surface), a transitional method has been created to make the adjoining textures on the top surface area of the ground blend together seamlessly. A unique texture is used for this purpose. This texture uses the same material as the flat "ground trim" texture seen on the top of every surface. The texture has a diagonally drawn alpha mask that blends from completely transparent to completely opaque from the bottom right corner of the texture to the top left corner. When this texture is drawn at the ends of each sloped surface where they change angle, the combination of the color channels and the alpha mask line up with adjoining textures to blend them together and create a seamless visual transition.

16 Claims, 7 Drawing Sheets

METHOD AND APPARATUS FOR CONSTRUCTING VIRTUAL SLOPED LANDSCAPES IN COMPUTER GRAPHICS AND ANIMATION

CROSS-REFERENCES TO RELATED APPLICATIONS

This application claims priority to U.S. Provisional Application No. 61/354,553, filed Jun. 14, 2010, the entire content of which is hereby incorporated by reference.

STATEMENT REGARDING FEDERALLY SPONSORED RESEARCH OR DEVELOPMENT

Not Applicable

FIELD

The technology herein relates to computer graphics and animation, and more particularly to efficiently constructing pleasing virtual landscapes in real time interactive graphics systems. More particularly, the technology herein relates to a landscape editor that allows users to interact with a computer graphics and animation system to construct sloped landscapes.

BACKGROUND AND SUMMARY

When it comes to landscapes, flat is generally boring. More interesting landscapes tend to have hills or sometimes even mountains. Hikers and backpackers generally seek out high places where few ever venture. Climbing up and descending steep slopes is rewarding both mentally and physically. Navigating hilly landscapes similarly is more interesting for the virtual traveler traveling through a virtual landscape in a computer graphics and animation system such as a video game.

In the past, virtual landscape design was typically performed by the game developer and could not be changed by an end user. The virtual landscape might be multi-level, but each level was fixed and predetermined. Some past games such as Nintendo's Pikmin provided randomness in dynamically changing or constructing aspects of virtual game levels and associated landscapes. More recently, some games have empowered end users to create their own levels and associated virtual landscapes.

For example, the Nintendo DS game "Mario vs. Donkey Kong 2: March of the Minis" featured an in-game editor that allowed end users to create their own virtual landscapes. Once created, these virtual landscapes could be exchanged between users throughout a user community to provide an endless supply of new and interesting levels and virtual landscapes. By empowering end users to create aspects of the game they are playing, a high level of interest is maintained and the game supplies an endless source of interest and fascination.

One challenge to providing in-game editing is to reach a good tradeoff between ease of use and flexibility. It is desirable for users to be able to simply place desired structures where they wish in the video game landscape they are building without having to worry about graphical details of how to connect these structures in ways that are aesthetically pleasing and realistic. The challenge to game developers is to come up with in-game editing tools that are easy to use but also powerful enough to provide high degrees of flexibility.

Some prior game development tools have allowed game developers to construct sloped landscapes. Generally speaking, these prior approaches did so by constraining the slope angles and using a fixed library of connector pieces to connect upper and lower sloped portions with flat or other surfaces. Unfortunately, restricting slope angles has the effect of limiting flexibility. For example, if a slope must always be 45°, then it can be used as a building block only to connect other points that have the appropriate spacing and height to accommodate a 45° slope between them. In contrast, end users may desirably wish to insert a sloped surface to connect virtually any two arbitrary points in the virtual landscape. This presents a challenge since it demands the sloped surface angle and connectors to the other surfaces the sloped surface is joining to be determined dynamically and efficiently.

The exemplary illustrative non-limiting technology herein provides solutions to in-game virtual landscape construction employing sloped surfaces. Within an exemplary illustrative non-limiting game there are both flat and sloped ground surfaces on which the game characters traverse. In areas where a sloped surface changes angle (i.e. where a sloped surface connects to a flat surface), a transitional method has been created to make the adjoining textures on the top surface area of the ground blend together seamlessly.

On the art side, a unique texture is used for this purpose. This texture uses the same material as the flat "ground trim" texture seen on the top of every surface (e.g., the green grass which lines the top surfaces of ground). What makes this texture unique is that it has a diagonally drawn alpha mask that blends from completely transparent to completely opaque from the bottom right corner of the texture to the top left corner. When this texture is drawn at the ends of each sloped surface where they change angle, the combination of the color channels and the alpha mask line up with adjoining textures to blend them together and create a seamless visual transition.

Users can for example design or specify a sloped surface that can have virtually any angle of slope within a range. Advantageous techniques and algorithms are employed to design aesthetically-pleasing and functional-looking connectors between each end of the sloped surface and other structures in the virtual landscape. In one exemplary illustrative non-limiting implementation, appropriate connector pieces such as triangles are dynamically selected and used to provide transition between sloped and other surfaces, and ground texture (in some cases with appropriate alpha gradient) is stretched over such connector pieces to provide aesthetically-pleasing and realistic-looking transitions.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Exemplary illustrative non-limiting technology herein provides method and apparatus to connect the texture of a top of a surface (e.g., the grass, the ground, any flat or horizontal surface, etc.) with an angled texture corresponding to a slope. On the slope, the same texture used for the flat surface is rotated to match the slope so that it looks the same. However, this ends up with a gap between the flat surface and the sloped surface. There are two ends to the slope that we wish to connect back to flat surfaces. The exemplary illustrative non-limiting implementation provides two different ways to connect those two surfaces.

An exemplary illustrative non-limiting connecting technique uses one method to connect the part of the flat surface that starts heading up uses a different method to connect the part of the sloped surface that heads back to flat. For the end that starts heading up the slope from the flat surface, the exemplary illustrative non-limiting implementation tiles, based on predetermined grid units, the same texture that is put on the flat ground onto the sloped ground. However, a sloped surface is not necessarily going to be divisible by its length with respect to grid units (the sloped surface length spanning n horizontal grid units is going to inherently have a length that is longer than n and which will not necessarily be evenly divisible by grid units if the angle of slope can be arbitrarily selected by the user). Accordingly, the exemplary illustrative non-limiting implementation slightly stretches or shrinks the texture so that the ends of the texture end up tiling perfectly. The resulting texture may look a little different that what it is on the flat surface, but because the slope can only be along the horizontal axis in units of the grid, the stretching is typically only a minor adjustment that is visibly unnoticeable. Meanwhile, the stretching makes sure that the texture perfectly ends up at a seam unit so that it will tile. See FIGS. 1, 1A, 2, 2A, 3 and 3A.

In addition, to prevent a gap, the exemplary illustrative non-limiting implementation inserts a triangle or other shape as a joint piece, so that from flat to heading up a triangle can be used to connect and fill the gap. Additionally, the exemplary illustrative non-limiting implementation stretches the last vertical slice of the texture along that triangle so that it fills it in the little gap and looks substantially seamless on that end.

For the top portion where the slope meets an upper flat surface, the exemplary illustrative non-limiting implementation uses another texture that is the same as the normal flat surface texture except for that it fades out to nothing (transparent). This texture is used in the lower right hand corner if the slope ascends from left to right or in the lower left hand corner if the slope ascends from right to left. The exemplary illustrative non-limiting implementation uses that texture map to draw another triangle on the top of the slope where it returns back to an upper horizontal surface. The exemplary illustrative non-limiting implementation places that triangle at the end of that slope, and the texture map is used to have the flat surface fade away its texture to the lower right (or left) of the slope. Because the texture overlaps the flat surface, the texture ends up blending away the fact that there was this harsh edge—it just kind of fades away generally into the flat surface of the top.

These techniques allow the exemplary illustrative non-limiting implementation to handle many different angles of slope because the triangles that are used to fill those connections change. The exemplary illustrative non-limiting implementation uses a selection algorithm to determine what triangle should be used for the bottom of the slope heading up, and uses a different algorithm to determine what triangle should be used to fill near the top of the slope heading back to flat. The exemplary illustrative non-limiting implementation combines these two techniques in order to create those in-between triangles at run time.

The technology herein thus auto-generates the triangles to connect the edges and can use one texture for the slope just by rotating and tiling it. The exemplary illustrative non-limiting implementation permits less graphics to be drawn and provides more freedom for the creation of the slopes. An in-game editor allows users to make their own levels with user-defined slopes at any angle. The exemplary illustrative non-limiting implementation successfully accommodates for the existence of virtually any angle slope. The exemplary illustrative non-limiting implementation adds adjoining pieces and actually stretches the surface texture of the slope a little bit as well so there is some tweaking of the slope texture itself to help ease the transition between the two flat surfaces.

The exemplary illustrative non-limiting implementation thus generates the adjoining pieces as well as stretching the texture covering the slope. One specific texture is used as part of the generation for the slope heading up and then going to a flat surface (i.e., the acute angle joint that's less that 180°).

Exemplary Illustrative Non-Limiting Hardware and Software Implementation

Figure 1:
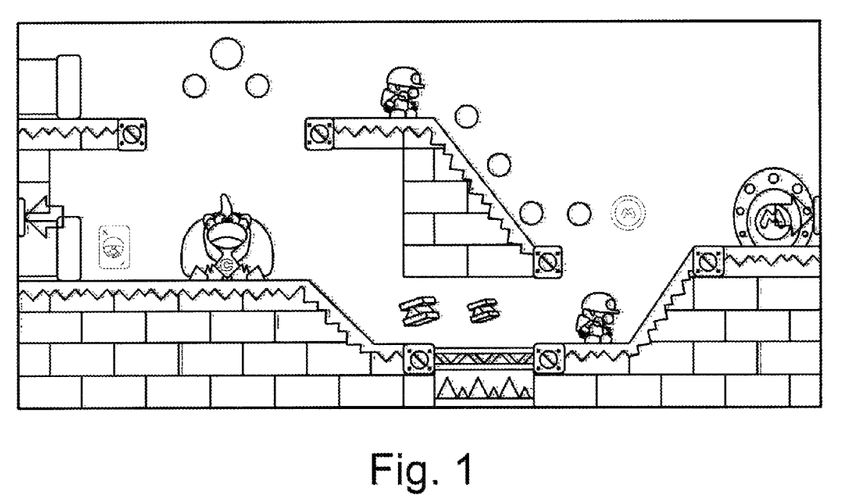
FIGS. 1, 2 and 3 show exemplary illustrative non-limiting game landscapes providing sloped surfaces.
Figure 1A:
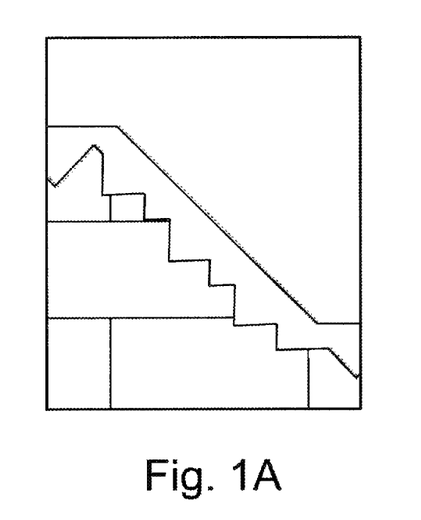
FIGS. 1A, 2A and 3A show detailed transitions between sloped and flat surfaces.
Figures 2, 2A:
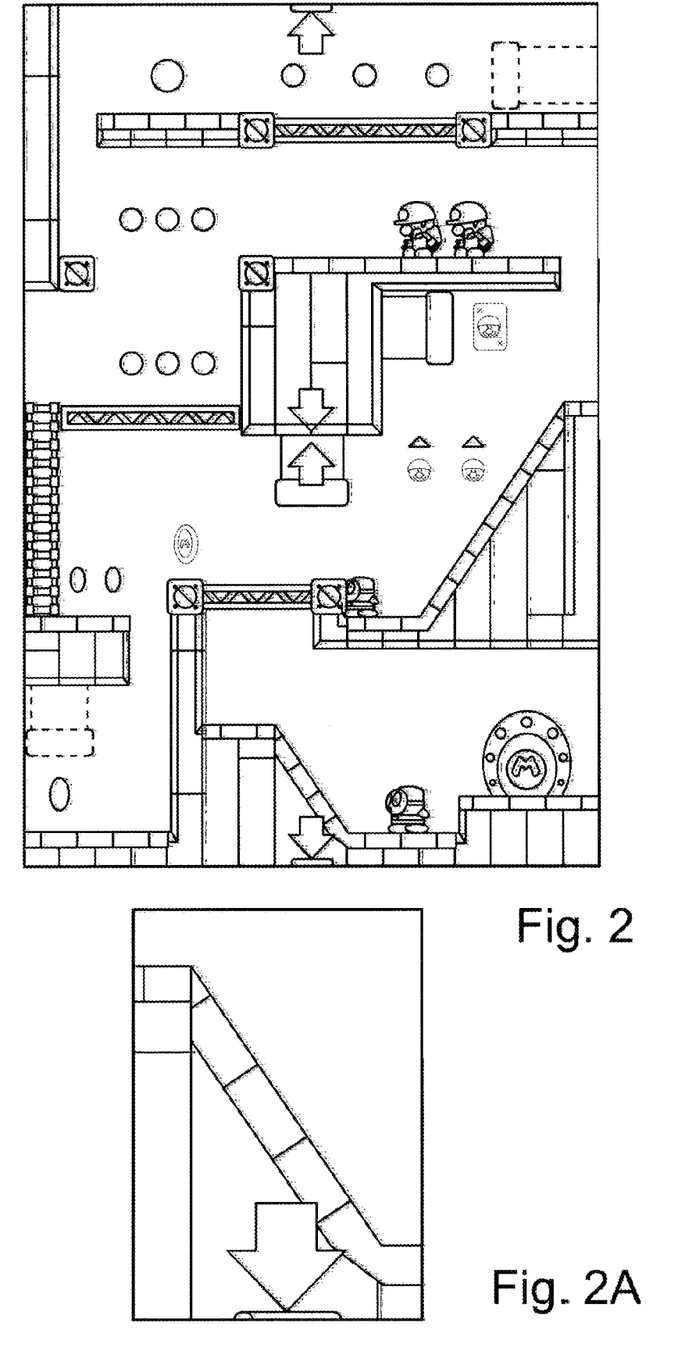
Figure 3:
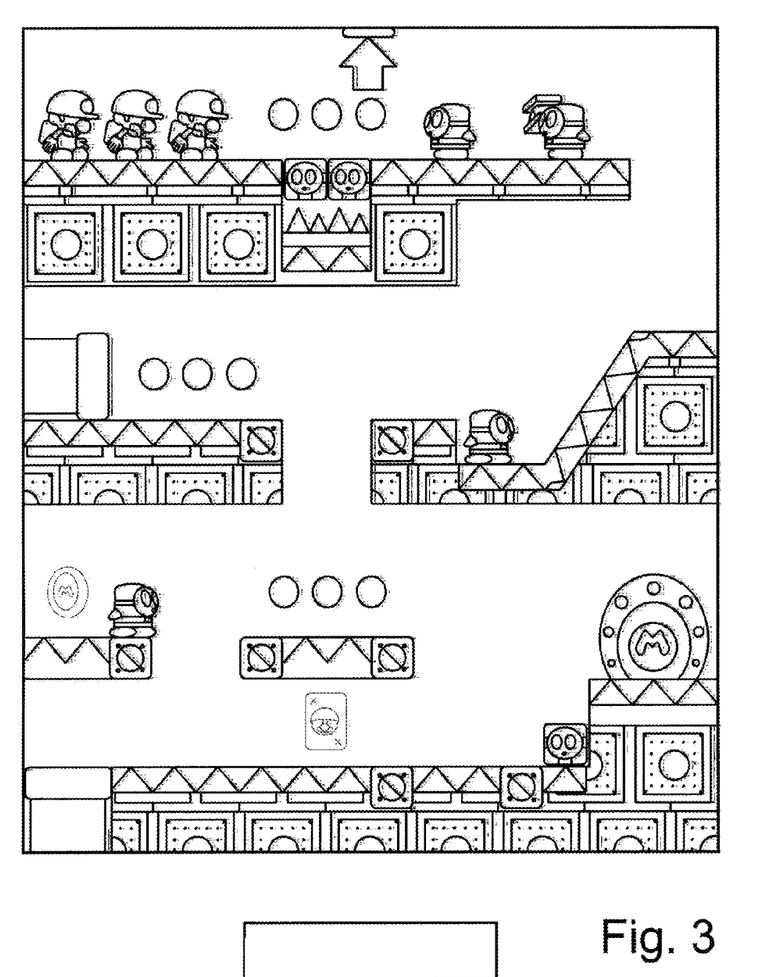
Figure 3A:
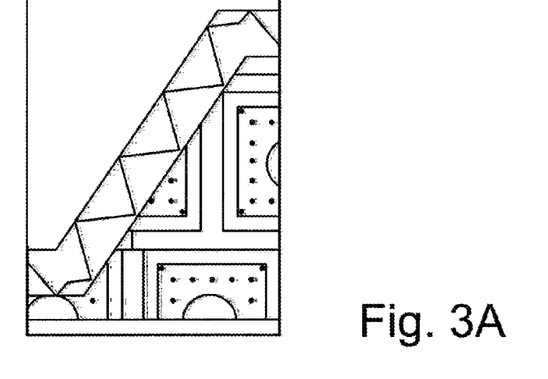
Figure 4A:
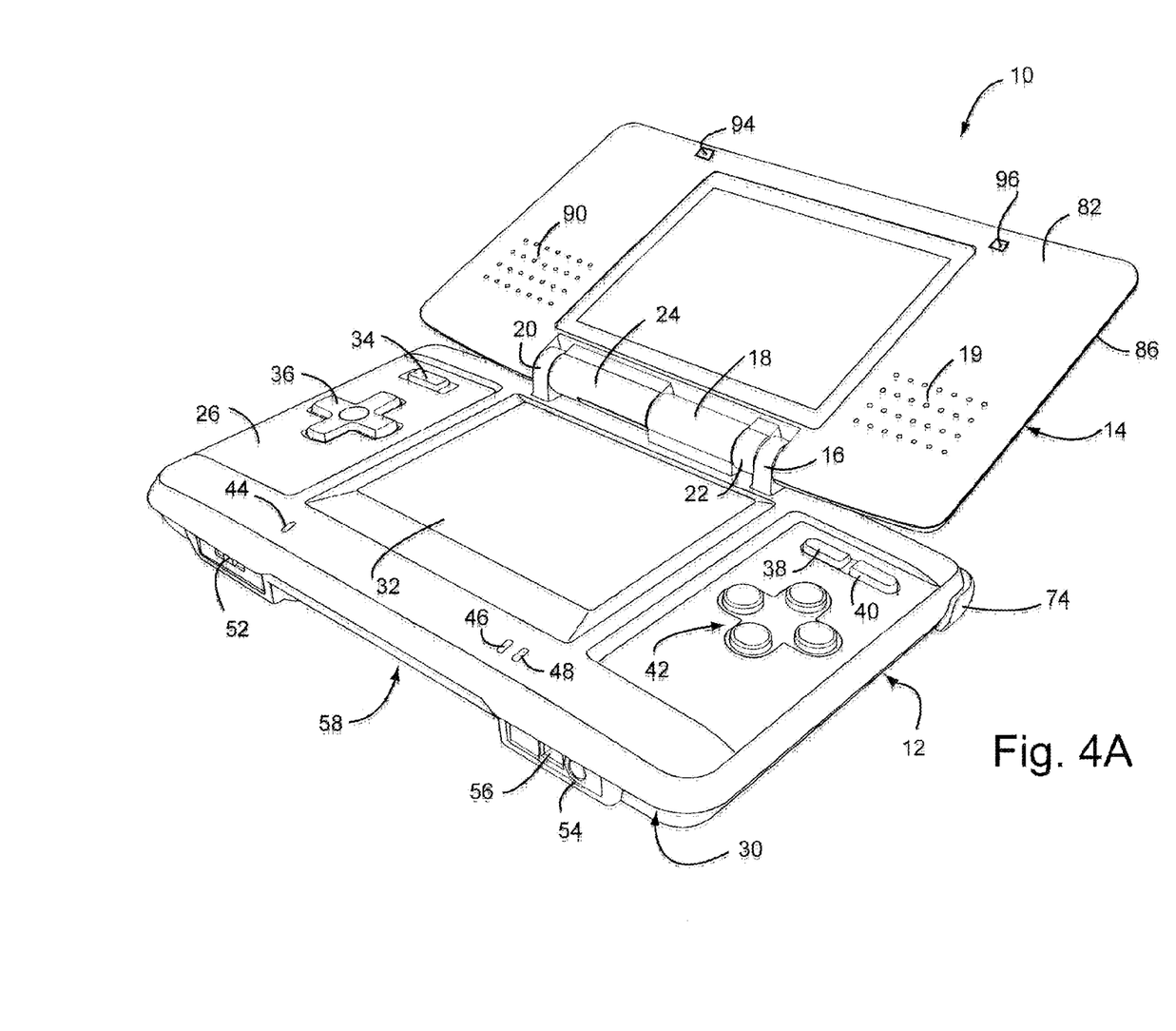
FIGS. 4A-4C show an exemplary illustrative non-limiting graphics generation appliance for use in implementing the exemplary illustrative non-limiting implementation.
Figure 4B:
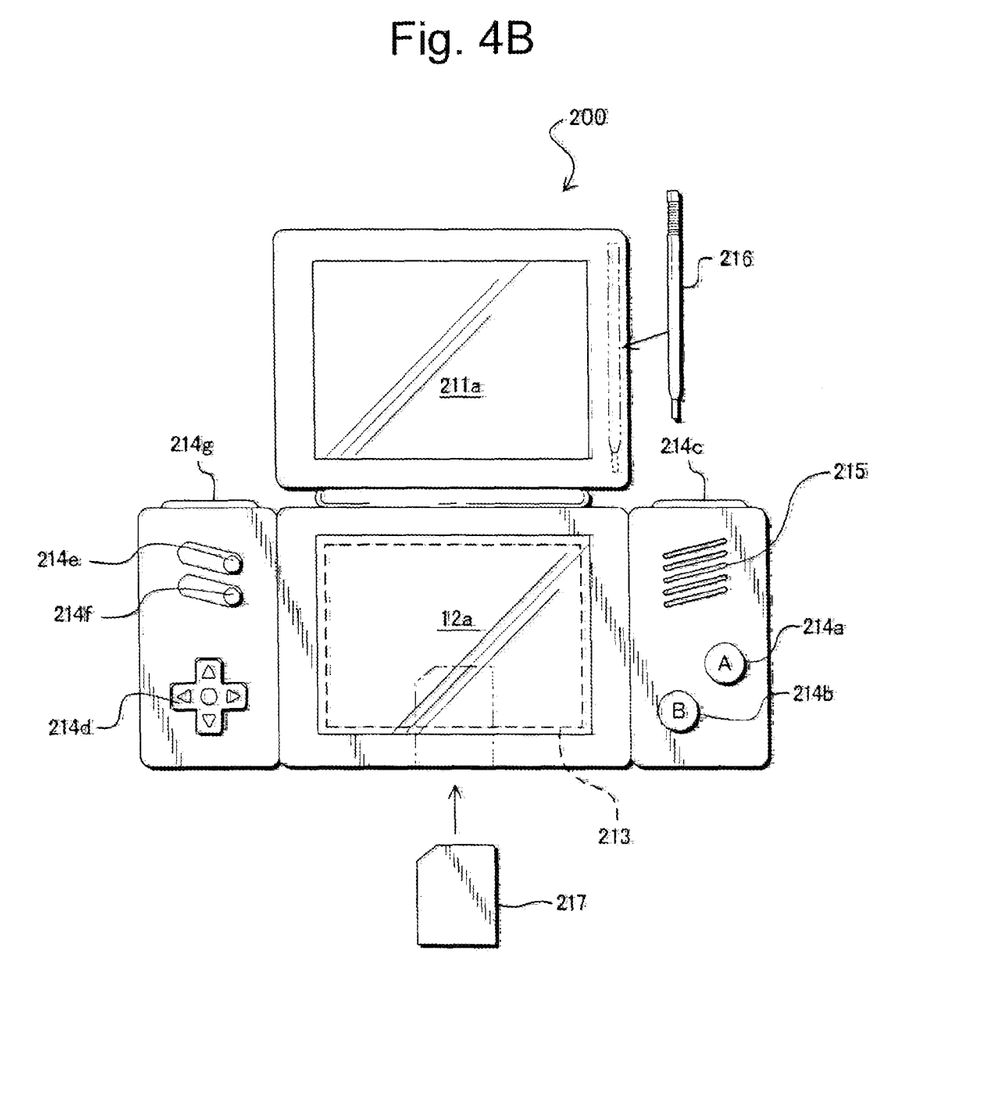
Figure 4C:
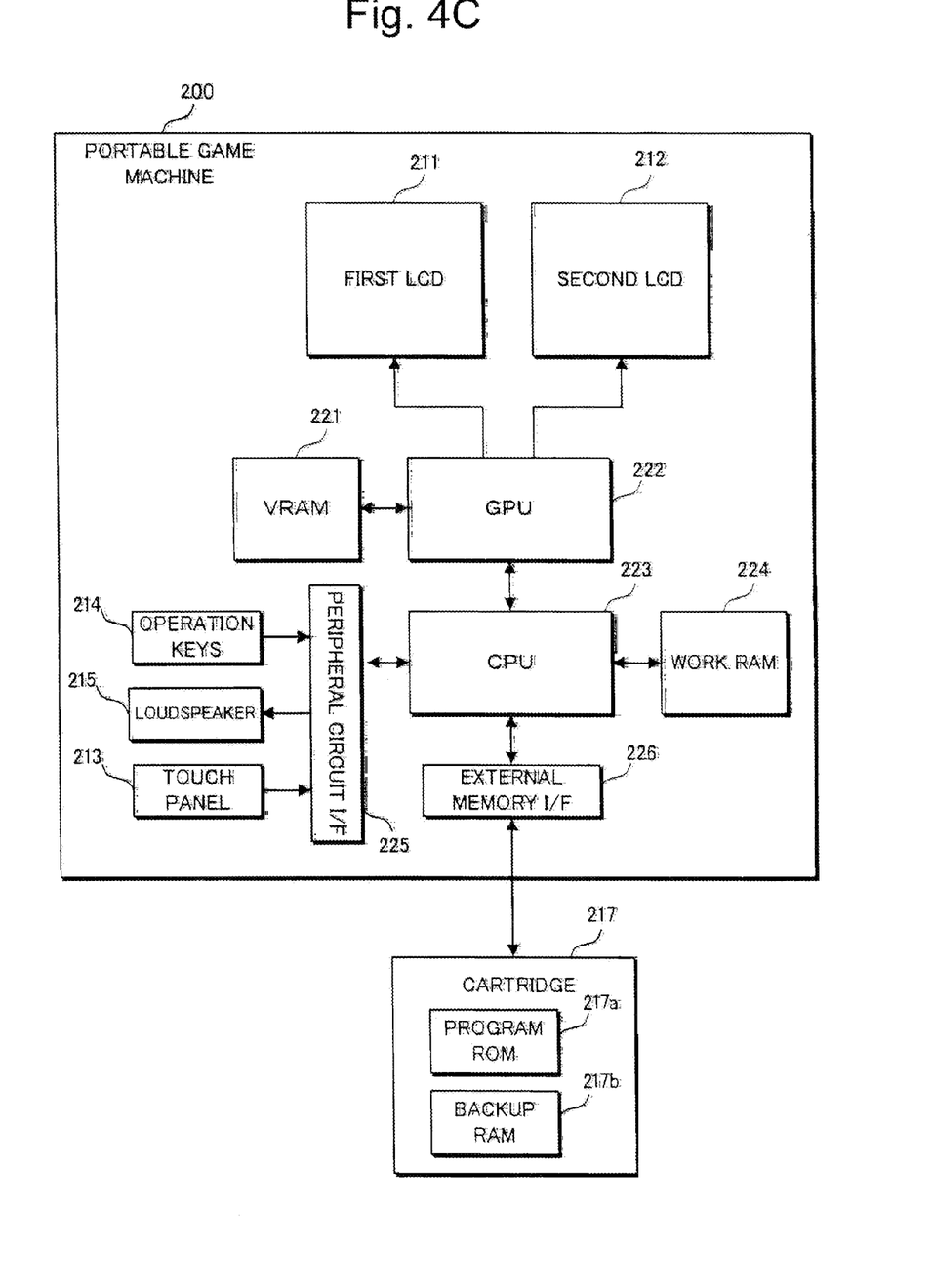

Referring to FIG. 4A, in an illustrative embodiment the game device or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the game on and off. A cross-shaped directional control button 36 is located adjacent and below the power button 34, and is used for game play control.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

FIG. 6B is a further illustrative embodiment of a portable game machine 200. As with the prior embodiment, a further exemplary game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 6B is an external view of the portable game machine 200. As shown in FIG. 6B, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

FIG. 6C is a block diagram showing the portable game machine 200. It should be understood that the hardware/software and operational description which follows is applicable to the illustrative embodiment shown in FIGS. 6A and 6B. As shown in FIG. 6C, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit e.g., through downloading.

Figure 5:
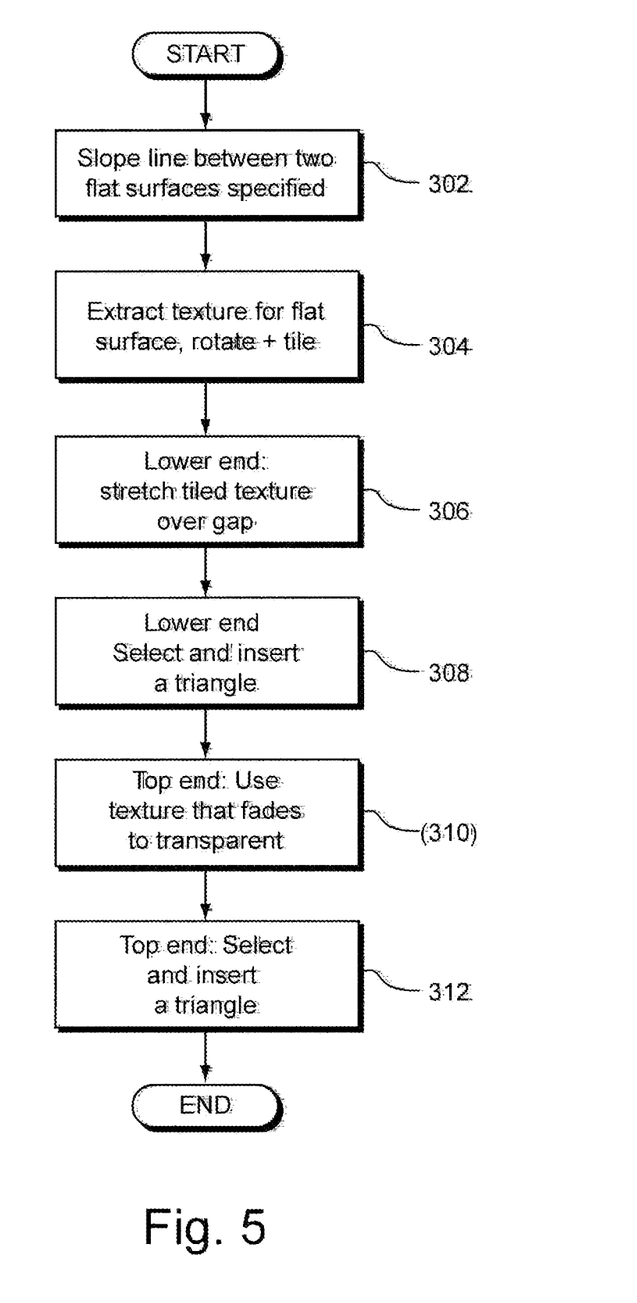
FIG. 5 is an exemplary illustrative non-limiting flowchart of program control steps.

FIG. 5 is a flowchart of exemplary program control steps used to control CPU 223 and the hardware described above. The program control steps shown may be stored for example in the external or internal storage media shown in FIG. 6C in the form of computer instructions. CPU 223 retrieves and executes these instructions to perform the process shown in FIG. 5.

As shown in FIG. 5, a slope line between two flat surfaces is first specified (block 302). Then, a texture for the flat surface(s) is extracted and rotated in accordance with the slope of the line, and used to tile the slope line (block 304). In the exemplary illustrative non-limiting implementation, different techniques are used to handle connections between the lower and upper ends of the tiled slope line. For the lower end, the tiled texture is stretched over the gap (block 306) and a triangle is selected and inserted at the gap in order to provide a smooth transition (block 308). At the upper end, a texture is used that fades to transparent as described above (block 310). An additional triangle is selected based on the slope angle and inserted into the gap to provide a smooth transition (block 312).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method of providing a user interface comprising:
receiving user input specifying a desired slope within a range;
in response to the received user input, dynamically, by computer, generating a virtual structure comprising a first element and an adjoining sloped element oriented with the specified desired sloped orientation that is angled relative to the orientation of the first element;
generating a texture map representing a transition between the sloped element and the first element, and rotating the texture map based on the specified desired slope to at least partially overlap the first element, the texture map comprising color channels and an alpha channel diagonal alpha mask, the alpha channel diagonal alpha mask defining a gradient in alpha channel transparency; and
texture mapping the texture map so the color channels and the alpha channel diagonal alpha mask line up with the first element and fade away the first element to create a visual transition blending the first element with the sloped element; including stretching a surface texture of the texture map to transition between the first element and the adjoining sloped element.

2. The method of claim 1 wherein the texture map is triangular.

3. The method of claim 1 wherein the stretching changes the size of the texture map to tile the texture map.

4. The method of claim 1 wherein the alpha mask blends from transparent to opaque thereby seamlessly blending the first element with the adjoining sloped element.

5. The method of claim 1 wherein the alpha mask blends from transparent at one corner of the texture map to opaque at another corner of the texture map.

6. The method of claim 1 wherein the texture mapping lines up the combination of the color channels and the alpha mask with adjoining textures to blend them together and create a visual transition.

7. The method of claim 1 wherein receiving comprises receiving user input from a touch sensitive surface.

8. A system for providing a user interface comprising:
a display;
an input device that supplies user input specifying a desired slope within a range;
a processor connected to the display, the processor being configured to in response to user input, dynamically, by computer, to execute instructions that generate a virtual structure comprising a first element and an adjoining sloped element oriented with the specified desired sloped orientation that is angled relative to the orientation of the first element;
generate a texture map representing a transition between the sloped element and the first element, and rotate the texture map based on the specified desired slope to at least partially overlap the first element, the texture map comprising color channels and an alpha channel diagonal alpha mask, the alpha channel diagonal alpha mask defining a gradient in alpha channel transparency; texture map the texture map so the color channels and the alpha channel diagonal alpha mask line up with the first element and to display the first element with a visual transition blending the first element with the sloped element; and stretch a surface texture of the texture map to transition between the first element and the adjoining sloped element.

9. The system of claim 8 wherein the texture map is triangular.

10. The system of claim 8 wherein the stretching changes the size of the texture map to tile the texture map.

11. The system of claim 8 wherein the alpha mask blends from transparent to opaque thereby seamlessly blending the first element with the adjoining sloped element.

12. The system of claim 8 wherein the alpha mask blends from transparent at one corner of the texture map to opaque at another corner of the texture map.

13. The system of claim 8 wherein the processor lines up the combination of the color channels and the alpha mask with adjoining textures to blend them together and create a visual transition.

14. The system of claim 8 wherein the input device comprises a touch sensitive surface.

15. A non-transitory storage medium for providing a user interface, said storage medium storing:
first instructions that, when executed by a computer, receive user input specifying a desired slope within a range and dynamically generate a virtual structure comprising a first element and an adjoining sloped element oriented with the specified desired sloped orientation that is angled relative to the orientation of the first element;
second instructions that, when executed by the computer, generate a texture map representing a transition between the sloped element and the first element, and rotate the texture map based on the specified desired slope to at least partially overlap the first element, the texture map comprising color channels and an alpha channel diagonal alpha mask, the alpha channel diagonal alpha mask defining a gradient in alpha channel transparency;
third instructions that, when executed by the computer, texture map the texture map so the color channels and the alpha channel diagonal alpha mask align with the first element and fade away the first element to create a displayed visual transition blending the first element with the sloped element; and
further instructions that stretch a surface texture of the texture map to transition between the first element and the adjoining sloped element.

16. The storage medium of claim 15 wherein the texture map is triangular.

* * * * *